United States Patent
Hodges et al.

(10) Patent No.: US 10,944,132 B2
(45) Date of Patent: Mar. 9, 2021

(54) DYNAMICALLY CHANGING INTERNAL STATE OF A BATTERY

(71) Applicant: Microsoft Technology Licensing, LLC, Redmond, WA (US)

(72) Inventors: Stephen E. Hodges, Cambridge (GB); Ranveer Chandra, Kirkland, WA (US); Julia L Meinershagen, Seattle, WA (US); Nissanka Arachchige Bodhi Priyantha, Redmond, WA (US); Anirudh Badam, Redmond, WA (US); Thomas Moscibroda, Redmond, WA (US); Anthony John Ferrese, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 16/059,658

(22) Filed: Aug. 9, 2018

(65) Prior Publication Data

US 2018/0375164 A1     Dec. 27, 2018

Related U.S. Application Data

(63) Continuation of application No. 14/624,808, filed on Feb. 18, 2015, now Pat. No. 10,158,148.

(51) Int. Cl.
*H01M 10/0566* (2010.01)
*H01M 10/42* (2006.01)
(Continued)

(52) U.S. Cl.
CPC ......... *H01M 10/425* (2013.01); *H01M 4/364* (2013.01); *H01M 4/62* (2013.01);
(Continued)

(58) Field of Classification Search
CPC .................. H01M 10/0566; H01M 10/052
See application file for complete search history.

(56) References Cited

U.S. PATENT DOCUMENTS 5,382,479 A * 1/1995 Schuster ............. H01M 2/1094
429/112
6,475,662 B1 * 11/2002 Spencer ................. H01M 6/30
429/102
(Continued)

FOREIGN PATENT DOCUMENTS

CN     1741346 A     3/2006
CN     1833425 A     9/2006
(Continued)

OTHER PUBLICATIONS

Paskevicius et al. 2013, Phys. Chem. Chem. Phys.,15, 19774-19789.*
(Continued)

*Primary Examiner* — Olatunji A Godo
(74) *Attorney, Agent, or Firm* — Schwegman Lundberg & Woessner, P.A.

(57) ABSTRACT

Techniques for dynamically changing internal state of a battery are described herein. Generally, different battery configurations are described that enable transitions between different battery power states, such as to accommodate different battery charge and/or discharge scenarios.

19 Claims, 8 Drawing Sheets

(51) Int. Cl.
  *H01M 10/615* (2014.01)
  *H01M 10/625* (2014.01)
  *H01M 4/36* (2006.01)
  *H01M 4/62* (2006.01)
  *H01M 10/04* (2006.01)
  *H01M 10/623* (2014.01)
  *H01M 4/13* (2010.01)
  *H01M 4/139* (2010.01)
  *H01M 10/052* (2010.01)
  *H01M 10/44* (2006.01)

(52) U.S. Cl.
  CPC ..... *H01M 10/049* (2013.01); *H01M 10/4235* (2013.01); *H01M 10/615* (2015.04); *H01M 10/623* (2015.04); *H01M 10/625* (2015.04); *H01M 4/13* (2013.01); *H01M 4/139* (2013.01); *H01M 10/052* (2013.01); *H01M 10/44* (2013.01); *H01M 2010/4271* (2013.01); *H01M 2220/20* (2013.01); *H01M 2220/30* (2013.01)

(56) References Cited

U.S. PATENT DOCUMENTS

| | | | |
|---|---|---|---|
| 6,495,067 B1* | 12/2002 | Ono | C09B 23/0075 252/299.61 |
| 2006/0043975 A1* | 3/2006 | Hart | H01M 6/36 324/426 |
| 2010/0310917 A1* | 12/2010 | Swift | H01M 6/36 429/112 |
| 2012/0210325 A1 | 8/2012 | de Lind van Wijngaarden et al. | |
| 2013/0281110 A1 | 10/2013 | Zelinka | |
| 2013/0293187 A1 | 11/2013 | Milios | |
| 2015/0032660 A1 | 1/2015 | Manfield et al. | |
| 2015/0123595 A1 | 5/2015 | Hussain et al. | |
| 2015/0208476 A1 | 7/2015 | Muramatsu et al. | |
| 2019/0107875 A1 | 4/2019 | Badam et al. | |

FOREIGN PATENT DOCUMENTS

| | | |
|---|---|---|
| CN | 100444496 C | 12/2008 |
| CN | 101581768 A | 11/2009 |
| CN | 102341991 A | 2/2012 |
| CN | 102395895 A | 3/2012 |
| CN | 102395896 A | 3/2012 |
| CN | 102520255 A | 6/2012 |
| CN | 102738844 A | 10/2012 |
| CN | 102754246 A | 10/2012 |
| CN | 103036243 A | 4/2013 |
| CN | 103219757 A | 7/2013 |
| CN | 103682293 A | 3/2014 |
| CN | 104104130 A | 10/2014 |
| CN | 104377770 A | 2/2015 |
| CN | 109143085 A | 1/2019 |
| EP | 0616226 A1 | 9/1994 |
| EP | 2460252 A2 | 6/2012 |
| JP | 2012038725 A | 2/2012 |
| WO | 2014136705 A1 | 9/2014 |

OTHER PUBLICATIONS

"Office Action Issued in Chinese Patent Application No. 201680010435.1", dated May 21, 2020, 18 Pages.
"Office Action Issued in Indian Patent Application No. 201747023173", dated Jun. 2, 2020, 6 Pages.
"Office Action Issued in Chinese Patent Application No. 201680009326.8", dated Sep. 2, 2019, 9 Pages.
"Office Action and Search Report Issued in Chinese Patent Application No. 201680010765.0", dated Dec. 3, 2019, 21 Pages.
"Non Final Office Action Issued in U.S. Appl. No. 14/626,518", dated Aug. 7, 2019, 33 Pages.
"Office Action and Search Report Issued in Chinese Patent Application No. 201680010435.1", dated Sep. 23, 2019, 9 Pages.
"Office Action and Search Report Issued in Chinese Patent Application No. 201680011168.X", dated Sep. 29, 2019, 25 Pages.
"Office Action Issued in Chinese Patent Application No. 201680012445.9", dated Sep. 23, 2019, 9 Pages.
"Final Office Action Issued in U.S. Appl. No. 14/662,938", dated Oct. 2, 2019, 44 Pages.
"Final Office Action Issued in U.S. Appl. No. 14/626,518", dated Jan. 23, 2020, 36 Pages.
"Non-Final Office Action Issued in U.S. Appl. No. 14/662,938", dated Feb. 14, 2020, 45 Pages.
"Non Final Office Action issued in U.S. Appl. No. 14/626,518", dated Jun. 13, 2019, 24 Pages.
"Non-Final Office Action Issued in U.S. Appl. No. 15/944,500", dated Jul. 5, 2019, 4 Pages.
"Final Office Action Issued in U.S. Appl. No. 14/885,858", dated Feb. 4, 2019, 24 Pages.
"Office Action Issued in European Patent Application No. 18203105.4", dated Feb. 26, 2019, 08 Pages.
"Search Report Issued in European Patent Application No. 18203105.4", dated Feb. 12, 2019, 04 Pages.
"First Office Action and Search Report Issued in Chinese Application No. 201680009337.6", dated Mar. 5, 2019, 26 Pages.
"Final Office Action Issued in U.S. Appl. No. 14/624,808", dated Dec. 29, 2017, 6 Pages.
"Non Final Office Action Issued in U.S. Appl. No. 14/624,808", dated May 23, 2017, 6 Pages.
"Non Final Office Action Issued in U.S. Appl. No. 14/626,518", dated Dec. 31, 2018, 37 Pages.
"Office Action Issued in European Patent Application No. 16707584.5", dated Nov. 23, 2018, 6 Pages.
"Non Final Office Action Issued in U.S. Appl. No. 14/662,938", dated Apr. 19, 2019, 40 Pages.
"Second Office Action Issued in Chinese Patent Application No. 2016800107650", dated Aug. 4, 2020, 8 Pages.
"Final Office Action Issued in U.S. Appl. No. 14/662,938", dated Jul. 29, 2020, 47 Pages.
U.S. Appl. No. 14/624,808, U.S. Pat. No. 10,158,148, filed Feb. 18, 2015, Dynamically Changing Internal State of a Battery.
"Third Office Action and Search Report Issued in Chinese Patent Application No. 201680010435.1", dated Sep. 15, 2020, 17 Pages.
"Final Office Action issued in Chinese Patent Application No. 201680010435.1", dated Dec. 22, 2020, 10 Pages.

* cited by examiner

DYNAMICALLY CHANGING INTERNAL STATE OF A BATTERY

CROSS-REFERENCE TO RELATED APPLICATION

This application is a continuation of and claims priority to U.S. patent application Ser. No. 14/624,808, filed Feb. 18, 2015, the contents of this prior application is considered part of this application, and is hereby incorporated by reference in its entirety.

BACKGROUND

Many devices today utilize some form of battery for various power needs, such as a primary power source, a backup power source, and so forth. Battery life is a primary concern, particularly with mobile devices such as mobile phones, portable computing devices, wearables, and so forth. Current battery designs typically provide little if any flexibility in affecting battery performance during various usage scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for dynamically changing internal state of a battery are described herein. Generally, different battery configurations are described that enable transitions between different battery power states, such as to accommodate different battery charge and/or discharge scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
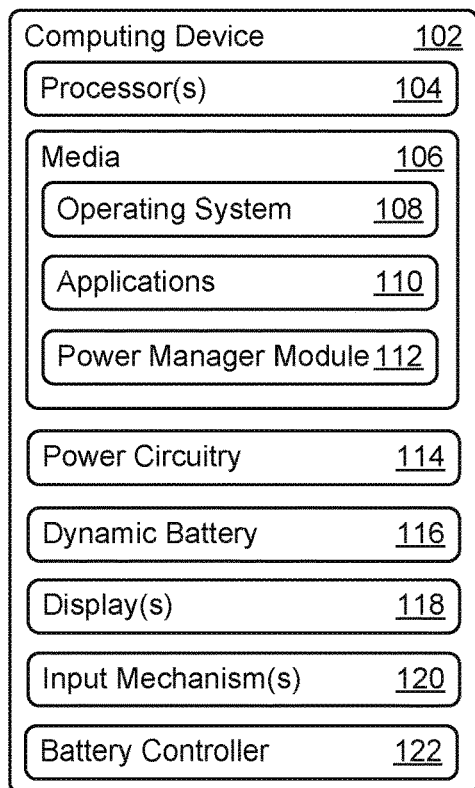
FIG. 1 is an illustration of an environment in an example implementation that is operable to employ techniques discussed herein in accordance with one or more embodiments.
Figure 1:
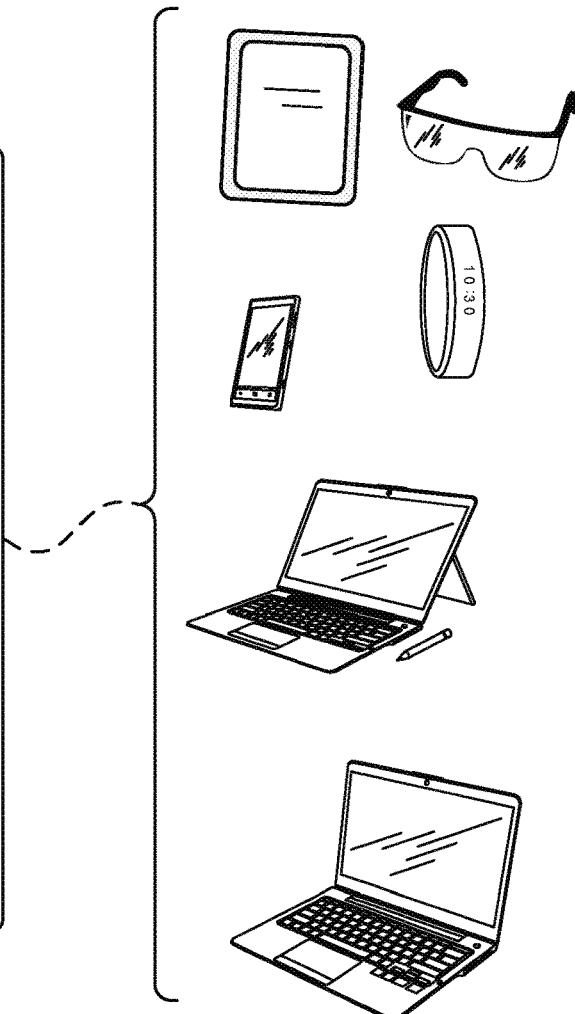

Techniques for dynamically changing internal state of a battery are described herein. Generally, different battery configurations are described that enable transitions between different battery power states, such as to accommodate different battery charge and/or discharge scenarios.

For instance, one or more implementations utilize temperature to control power state of a battery. Consider, for example, a scenario where a mobile device detects that additional battery life is required, such as to keep the device powered on, to provide power for a high-priority application, and so forth. In response, heat is applied to a battery of the mobile device to cause an electrolyte within the battery to swell. Generally, swelling of the electrolyte increases the ability of the battery to discharge its available stored charge, e.g., increases its discharge capacity. For instance, swelling of the electrolyte increases the ion porosity of the internal components of the battery such that increased ion exchange is promoted.

In another example scenario, a fast battery charge may be desired. For instance, a user may be at an airport and may wish to quick charge their mobile device prior to boarding a plane. Accordingly, the user plugs their device into a power source (e.g., a mains alternating current (AC) outlet or a charging station) to begin battery charging. As part of the quick charge implementation, heat is applied to an electrolyte of the battery to cause electrolyte swelling and thus increase porosity of internal components of the battery. This increase in porosity increases the rate at which electrical charge is retained by the battery, e.g., compared with a non-heated implementation.

In alternative or additional implementations, a mixed electrode battery configuration is utilized that includes activatable materials that are activatable in response to various stimuli to accommodate different power scenarios. For instance, an example battery includes a primary electrode material that provides power during standard operating scenarios, and a dynamic electrode material that is generally inactive during standard operating scenarios. When a power event occurs that indicates an increased power requirement additional battery life), the dynamic electrode material is activated to increase ion and/or electrical conductivity across the dynamic electrode material. Generally, activation of the dynamic electrode material increases discharge capacity and/or practical charge rate of the battery. Various stimuli may be utilized to activate the dynamic electrode material, such as applied heat, catalytic activation, mechanical activation (e.g., battery vibration), high frequency radio frequency (RF) waves, and so forth. Further details and implementations are described below.

In the following discussion, an example environment is first described that is operable to employ techniques described herein. Next, a section entitled "Example Dynamic Batteries" describes some example batteries in accordance with one or more implementations. Following this, a section entitled "Example implementation Scenarios" describes some example scenarios for dynamically changing internal state of a battery in accordance with one or more embodiments. Next, a section entitled "Example Procedure" describes an example procedure for dynamically changing internal state of a battery in accordance with one or more embodiments. Finally, a section entitled "Example System and Device" describes an example system and device that are operable to employ techniques discussed herein in accordance with one or more embodiments.

Example Environment

FIG. 1 illustrates an example environment 100 for performing techniques for dynamically changing internal state of a battery. Environment 100 includes a computing device 102, which may be implemented in various ways. The computing device 102, for instance, may be configured as a traditional computer (e.g., a desktop personal computer, laptop computer, and so on), a mobile station, an entertainment appliance, a wireless phone, a tablet, a netbook, a wearable device, and so forth as further described in relation to FIG. 8.

Thus, the computing device 102 may range from a full resource device with substantial memory and processor resources (e.g., personal computers, game consoles) to a low-resource device with limited memory and/or processing resources, such as a traditional set-top box, hand-held game console, wearable device, smart appliance (e.g., "Internet of Things" (IoT) device), health monitoring and assistance device, personal navigation device, and so forth. The computing device 102 also relates to software that causes the computing device 102 to perform various operations. Further, while implementations are discussed herein with reference to a computing device, it is to be appreciated that techniques discussed herein may be utilized in any apparatus that utilizes batteries, such as a medical device, a vehicle (e.g., an electronic vehicle), a robotic machine, a toy, and so forth. The computer device 102, for instance, may represent an internal controller of an apparatus.

Computing device 102 includes computer processor(s) 104 and computer-readable storage media 106 (media 106). Media 106 includes an operating system 108, applications 110, and a power manager module (hereinafter "power manager") 112.

Computing device 102 also includes power circuitry 114 and a dynamic battery 116. According to various implementations, the dynamic battery 116 represents one or more battery cells from which the computing device 102 draws power to operate, and which are rechargeable to replenish power within the dynamic battery 116. Generally, power circuitry 114 represents functionality to enable the computing device 102 to draw operating power from the dynamic battery 116 or to apply charging power to the dynamic battery 116. Although a single dynamic battery 116 is illustrated, it is to be appreciated that the dynamic battery 116 may include any suitable number or type of battery cells and may be implemented according to a variety of different types and form factors of batteries. Implementations and uses of the power circuitry 114 and the dynamic battery 116 vary and are described in greater detail below.

The power manager 112 is representative of functionality to enable various operational parameters of the dynamic battery 116 to be controlled. For instance, the power manager 112 may interface with the power circuitry 114 and/or directly with the dynamic battery 116 to configure and reconfigure operational parameters, operational state, and/or physical state of the dynamic battery 116.

Computing device 102 also includes one or more displays 118 and input mechanisms 120. The displays 118 are generally representative of hardware and logic for visual output. The input mechanisms 120 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. The input mechanisms 120 may be separate or integral with displays 118; integral examples including gesture-sensitive displays with integrated touch-sensitive or motion-sensitive sensors.

The operating system 108 manages resources of computing device 102 and may be implemented using any suitable instruction format. For instance, the operating system 108 generally enables functionalities of the computing device 102 to access hardware and logic resources of computing device 102. Although the power manager 112 is illustrated separately from the operating system 108, it is to be appreciated that in at least some implementations, functionality of the power manager 112 may be implemented as part of the operating system 108.

The applications 110 include any suitable type of application and/or service, such as productivity applications, web browsers, media viewers, navigation applications, multimedia editing applications, and so forth. According to various implementations, the applications 110 may be implemented as locally-installed code that is executed as part of a local runtime environment. Additionally or alternatively, the applications 110 represent portals to distributed functionality, such as web services, cloud services, distributed enterprise services, and so forth.

The computing device 102 further includes a battery controller 122, which is representative of functionality to control different state conditions of the dynamic battery 122. For instance, the battery controller 122 is configured to provide various types of stimulus to the dynamic battery 116 to change an internal state of the dynamic battery 116, such as to change a power state of the dynamic battery 116. In at least some implementations, the battery controller 122 is physically and/or communicatively associated with the dynamic battery 116. Example implementations and operations of the battery controller 122 are discussed below.

Having discussed an example environment in which techniques for dynamically changing internal state of a battery may be employed, consider now some example dynamic batteries in accordance with one or more implementations.

Example Dynamic Batteries

This section describes some example dynamic batteries in accordance with one or more implementations. The example dynamic batteries, for instance, represent different example implementations of the dynamic battery 116. The illustrations of the example dynamic batteries are simplified for ease of understanding, and it is to be appreciated that the example dynamic batteries can be implemented according to a wide variety of different configurations and form factors within the spirit and scope of the claimed implementations.

Figure 2:
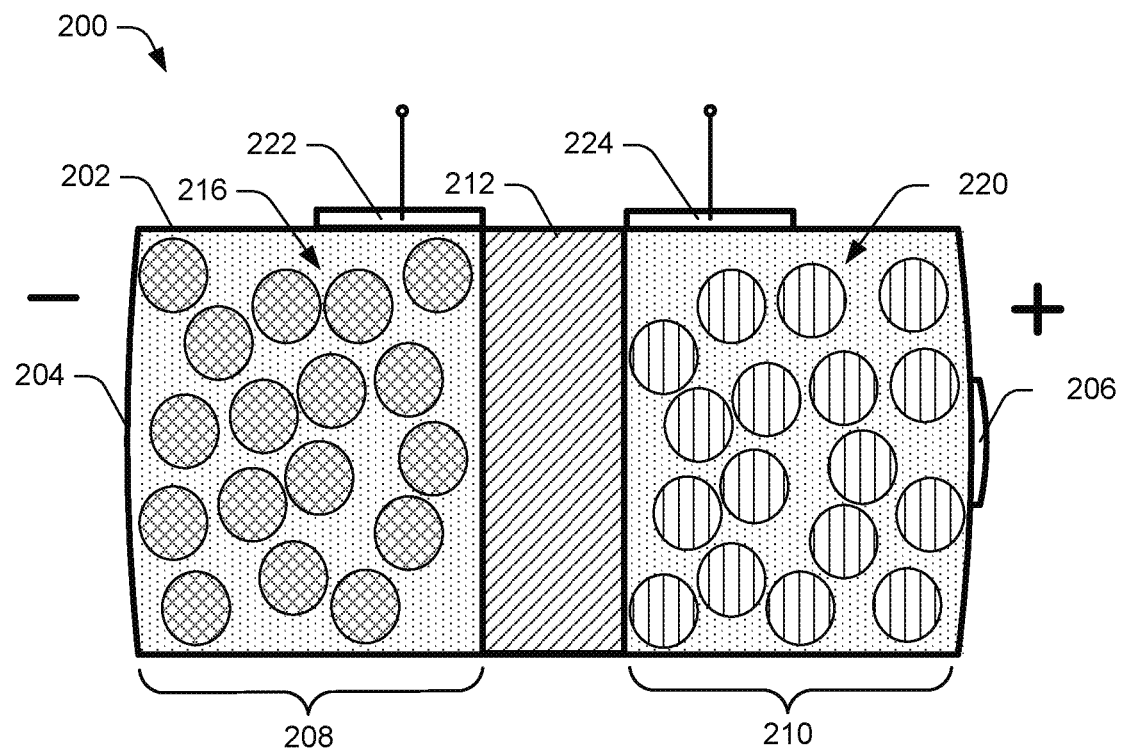
FIG. 2 illustrates a side cross-section of an example dynamic battery in accordance with one or more embodiments.

FIG. 2 illustrates a side cross-section of an example dynamic battery 200 in accordance with one or more implementations. The dynamic battery 200 includes a can 202, a negative terminal 204, and a positive terminal 206. Generally, the can 202 represents an external wrapper of the dynamic battery 200 that serves to contain internal components of the dynamic battery 200.

The internal components of the dynamic battery 200 include an anode (negative electrode) 208 and a cathode (positive electrode) 210 separated by a separator 212. The anode 208 includes anode material 214 and electrolyte 216, and the cathode 210 includes cathode material 218 and electrolyte 220. According to various implementations, the electrolyte 216 and the electrolyte 220 represent the same electrolyte, or two different types of electrolytes.

The anode material 214 represents a material to which negative ions will migrate, and the cathode material 218 represents a material to which positive ions will migrate. Generally, the separator 212 represents a physical divider that allows ions to flow between the anode 208 and the cathode 210, but prevents mixing of the anode material 214 with the cathode material 218, and mixing of the electrolyte 216 with the electrolyte 220.

The dynamic battery 200 further includes a battery controller 222 and a battery controller 224. The battery controllers 222, 224, for instance, represent implementations of the battery controller 122 introduced above. The battery controller 222 is representative of functionality to interact with components of the anode 208 to enable transitions between different operational modes, examples of which are discussed below. In at least some implementations, the battery controller 222 is communicatively connected to the power circuitry 114 and/or the power manager 112.

The battery controller 224 is representative of functionality to interact with components of the cathode 210 to enable transitions between different operational modes, examples of which are discussed below. In at least some implementations, the battery controller 224 is communicatively connected to the power circuitry 114 and/or the power manager 112. Further operational aspects of the battery controller 222 and the battery controller 224 are discussed below.

In at least some implementations, one or more of the battery controllers 222, 224 may interact with the separator 212 to cause physical and/or chemical reconfiguration of the separator 212. For instance, techniques discussed herein may be employed to activate the separator 212 to increase ion flow across the separator 212, such as to increase battery life, increase charging rate, and so forth.

Figure 3:
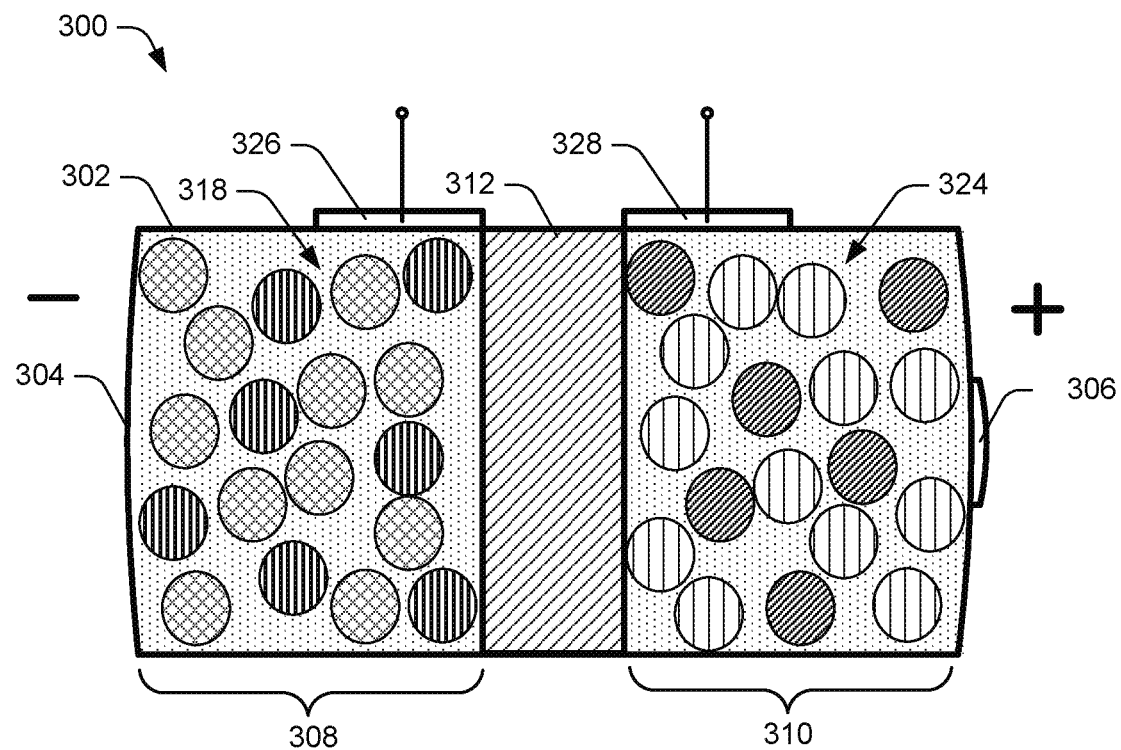
FIG. 3 illustrates a side cross-section of an example dynamic battery in accordance with one or more embodiments.
Figure 3:
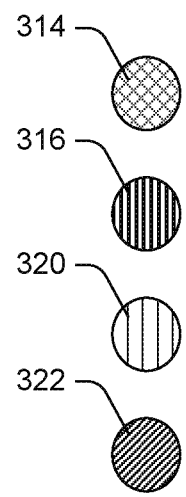

FIG. 3 illustrates a side cross-section of an example dynamic battery 300 in accordance with one or more implementations. The dynamic battery 300 includes a can 302, a negative terminal 304, and a positive terminal 306. Generally, the can 302 represents an external wrapper of the dynamic battery 300 that serves to contain internal components of the dynamic battery 300.

The internal components of the dynamic battery 300 include an anode 308 and a cathode 310 separated by a separator 312. The anode 308 includes primary anode material 314, dynamic anode material 316, and electrolyte 318. The primary anode material 314 and the dynamic anode material 316 are formed from different respective materials and generally represent materials to which negative ions will migrate. Example materials that may be used to form the primary anode material 314 include graphite, silicon, and so forth. Examples materials that may be utilized to form the dynamic anode material 316 include silicon alloys, sulfur, lithium alloys, and so forth. As further detailed below, the dynamic anode material 316 can be transitioned between different states to accommodate different operating and power scenarios.

The cathode 310 includes primary cathode material 320, dynamic cathode material and cathode electrolyte 324. The primary cathode material 320 and the dynamic cathode material 322 are formed from different respective materials and generally represent materials to which positive ions will migrate. Example materials that may be used to form the primary cathode material 320 include lithium compounds (e.g., lithium cobalt oxide), nickel, and so forth. Examples materials that may be utilized to form the dynamic cathode material 322 include titanium compounds (e.g., titanium dioxide), lithium iron phosphate, and so forth. As further detailed below, the dynamic cathode material 322 can be transitioned between different states to accommodate different operating scenarios. According to various implementations, the electrolyte 318 and the electrolyte 324 represent the same electrolyte, or two different types of electrolytes.

Generally, the separator 312 represents a physical divider that allows ions to flow between the anode 308 and the cathode 310, but prevents mixing of internal components of the anode 308 with internal components of the cathode 310.

The dynamic battery 300 further includes a battery controller 326 and a battery controller 328. The battery controllers 326, 328, for instance, represent implementations of the battery controller 122 introduced above. The battery controller 326 is representative of functionality to interact with components of the anode 308 to enable transitions between different operational modes, examples of which are discussed below. In at least some implementations, the battery controller 326 is communicatively connected to the power circuitry 114 and/or the power manager 112.

The battery controller 328 is representative of functionality to interact with components of the cathode 310 to enable transitions between different operational modes, examples of which are discussed below. In at least some implementations, the battery controller 328 is communicatively connected to the power circuitry 114 and/or the power manager 112. Further operational aspects of the battery controller 326 and the battery controller 328 are discussed below.

In at least some implementations, one or more of the battery controllers 326, 328 may interact with the separator 312 to cause physical and/or chemical reconfiguration of the separator 312. For instance, techniques discussed herein may be employed to activate the separator 312 to increase ion flow across the separator 312, such as to increase battery life, increase charging rate, and so forth.

Having discussed some example dynamic batteries, consider now some example implementation scenarios in accordance with one or more implementations.

Example Implementation Scenarios

This section describes some example implementation scenarios for dynamically changing internal state of a battery in accordance with one or more implementations. Generally, the implementation scenarios are described as being implemented in the environment 100 via the computing device 102, but may be implemented in any suitable environment.

Figure 4:
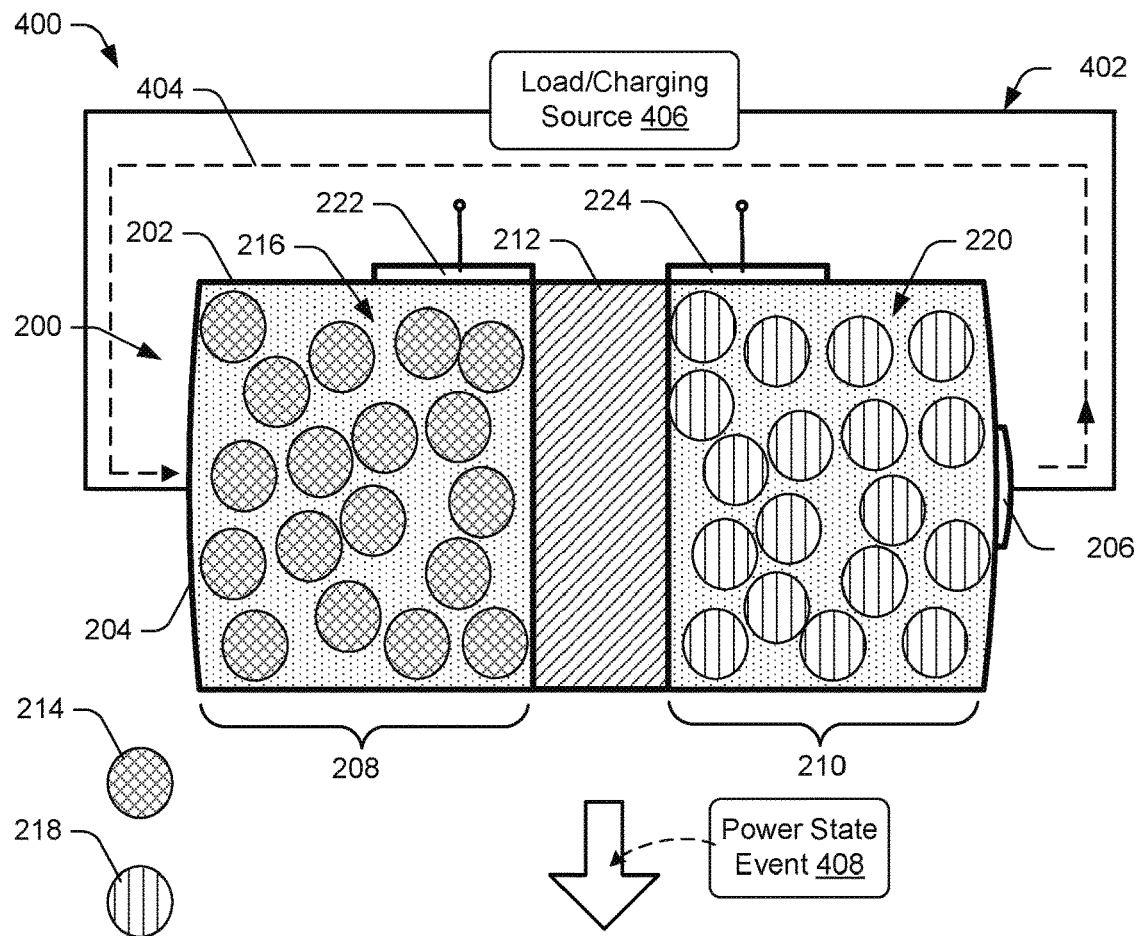
FIG. 4 depicts an example implementation scenario for changing internal state of a dynamic battery in accordance with one or more embodiments.
Figure 4:
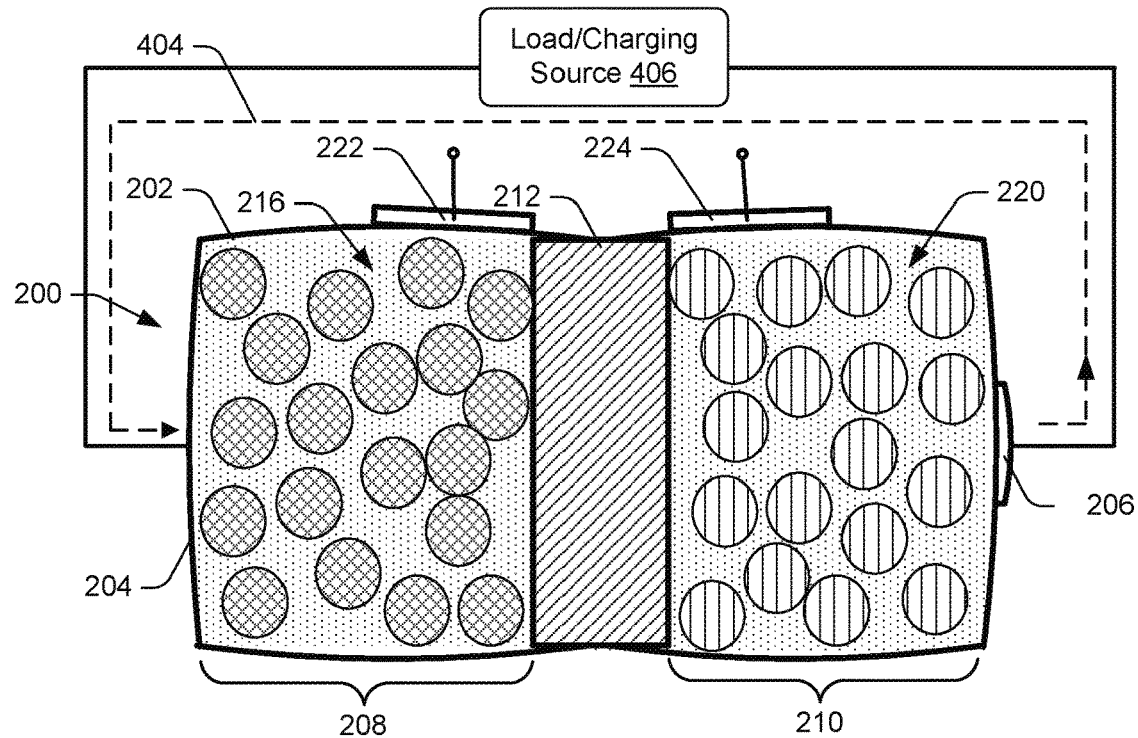

FIG. 4 depicts an example implementation scenario 400 for changing internal operational state of a dynamic battery in accordance with one or more implementations. The upper portion of the scenario 400 includes the dynamic battery 200 (introduced above) connected to a circuit 402 with a current flow 404 across the circuit 402. The circuit 402, for instance, represents a power supply line to power various components of the computing device 102 including a load/charging source 406 powered by and/or that provides charging power to the dynamic battery 200. Thus, the current flow 404 may alternate between representing a load current that draws current from the dynamic battery 200, and a charging current for charging the dynamic battery 200.

Proceeding to the lower portion of the scenario 400, a power state event 408 occurs to initiate a change in power state for the dynamic battery 200. According to various implementations, the power state event 408 represents a power discharge event and/or a power charge event. Examples of a power discharge event include an indication that increased discharge capacity from the dynamic battery 200 is required for the circuit 402. A power discharge event, for instance, may be generated in response to an increase in a power requirement for one or more components of the computing device 102, such as for a hardware component, a software component (e.g., an application 110), and so forth. Conversely, a power charge event may be generated in response to an indication to increase a rate at which the dynamic battery 200 charges, such as for a quick charge scenario.

In response to the power state event 408, the battery controller 222 interacts with the electrolyte 216 to cause the electrolyte 216 to swell. For instance, the battery controller 222 includes a heating apparatus that heats the electrolyte 216 such that the electrolyte 216 swells in volume. The electrolyte 216, for example, is implemented as a liquid crystal solution that swells when heated.

As another example, the battery controller 222 may include a releasable catalyst that when injected into the electrolyte 216, causes the electrolyte 216 to swell. Examples of a suitable catalyst include platinum, silicon dioxide, titanium dioxide, zeolites, and so forth. Generally, swelling of the electrolyte 216 increases the discharge capacity of the dynamic battery 200 such that effective charge life of the dynamic battery 200 is increased. For instance, causing the electrolyte 216 to swell increases the porosity of the anode 208 (e.g., of the electrolyte 216 and/or the anode material 214) such that the current flow 404 can be maintained for a longer period of time than when the electrolyte 216 is in a standard (e.g., non-swelled) state. In a charging scenario, increasing the porosity of the anode 208 increases the rate at which the dynamic battery 200 charges, such as to accommodate a quick charge scenario.

Optionally or additionally to the anode 208, the battery controller 224 can cause the electrolyte 220 to swell in a similar manner as the anode 208 to increase the discharge capacity of the cathode 210.

Consider, for instance, a scenario where the electrolyte 216 and/or the electrolyte 220 are implemented as a liquid crystal material. In such a scenario, activation of the liquid crystal material causes a phase change in the liquid crystal to increase ion permeability of the dynamic anode material 602. Increasing the ion permeability promotes ion flow across the dynamic battery 200 and increases the discharge capacity (e.g., charge life) and/or charging rate of the dynamic battery 200.

In at least some implementations, swelling of the electrolyte 216 and/or the electrolyte 220 causes the dynamic battery 200 to swell in size. Accordingly, in one or more implementations the computing device 102 is configured to accommodate physical swelling of the dynamic battery 200, such as via flexibility of the computing device 102 to swell with the dynamic battery 700, and/or additional space surrounding the dynamic battery to accommodate the swelling.

According to various implementations, a further power state event may be generated to cause the dynamic battery 200 to return to a normal operational mode. For instance, in response to the further power state event, the battery controller 222 may stop heating the electrolyte 216 such that the electrolyte 216 contracts, e.g., is no longer swollen. Similarly, the battery controller 224 may stop heating the electrolyte 220 such that the electrolyte 220 contracts. For instance, in response to the further power state event, the dynamic battery 200 returns to the state illustrated in the upper portion of the scenario 400.

Figure 5:
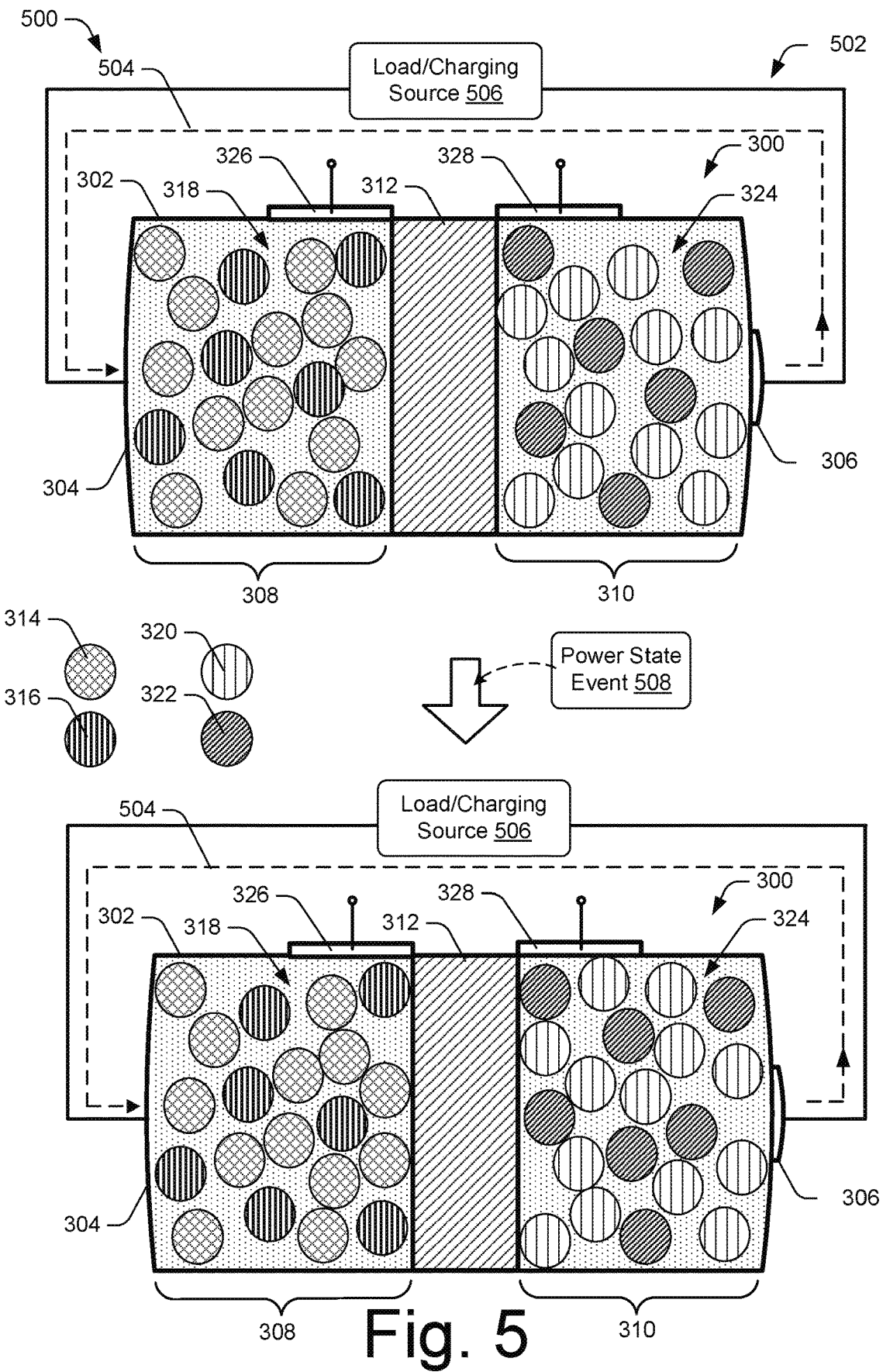
FIG. 5 depicts an example implementation scenario for changing internal state of a dynamic battery in accordance with one or more embodiments.

FIG. 5 depicts an example implementation scenario 500 for changing operational state of a dynamic battery in accordance with one or more implementations. The scenario 500, for instance, represents an alternative and/or additional implementation to the scenario 400 discussed above.

The upper portion of the scenario 500 includes the dynamic battery 300 (introduced above) connected to a circuit 502 with a current flow 504 across the circuit 502. The circuit 502, for instance, represents a power supply line to power various components of the computing device 102 including a load/charging source 506 powered by and/or that provides charging power to the dynamic battery 300. Thus, the current flow 504 may alternate between representing a load current that draws power from the dynamic battery 300, and a charging current for charging the dynamic battery 300.

In the upper portion of the scenario 500, the dynamic battery 300 is in a standard operating state. In the standard operating state, current flow across the circuit 502 is based primarily on electrical activity of the primary anode material 314 and the primary cathode material 320. For instance, in the primary operating state, most or all of the ion exchange for the dynamic battery 300 occurs across the primary anode material 314 and the primary cathode material 320. Further, in the primary operating state, the dynamic anode material 316 and the dynamic cathode material 322 are in an inactive state such that little or no ion exchange occurs across the dynamic anode material 316 and the dynamic cathode material 322.

Proceeding to the lower portion of the scenario 500, a power state event 508 occurs to initiate a change in power state for the dynamic battery 300. According to various implementations, the power state event 508 represents a power discharge event and/or a power charge event. Examples of different power state events are discussed elsewhere herein.

Responsive to the power state event 508, the battery controller 326 activates the dynamic anode material 316. For instance, the battery controller 326 provides a stimulus to activate the dynamic anode material 316. In one example, the battery controller 326 heats the anode 308, causing heat activation of the dynamic anode material 316. In another example, the battery controller 326 causes a catalyst to be released into the anode 308, which activates the dynamic anode material 316. Examples of a suitable catalyst include platinum, silicon dioxide, titanium dioxide, zeolites, and so forth. Other types of activation stimulus may be additionally or alternatively employed, such as high frequency radio frequency (RF) wave activation, magnetic activation, mechanical activation (e.g., battery vibration), light activation (e.g., using infrared, ultraviolet, and so on), and so forth.

Further to the scenario 500, activation of the dynamic anode material 316 causes an increase in ion flow and/or electrical conductivity across the dynamic anode material 316. For instance, in the standard operating state discussed above, little or no ion flow and/or electrical conductivity curs across the dynamic anode material 316. When activated, however, ion flow and/or electrical conductivity across the dynamic anode material 316 increases. This increase in ion flow and/or electrical conductivity increases the discharge capacity (e.g., effective discharge lifetime) of the dynamic battery 300. Further, the increase in ion flow and/or electrical conductivity increases a rate at which the dynamic anode material 316 is charged in a battery charging scenario.

According to various implementations, similar activity occurs in the cathode 310. For instance, the cathode controller 320 causes activation of the dynamic cathode material 322 such that ion flow and/or electrical conductivity across the dynamic cathode material 322 increases. Example ways of activation are discussed above.

As an additional or alternative implementation to the stimulus discussed above, activation of the dynamic anode material 316 and/or the dynamic cathode material 322 may occur incidentally in response to a voltage drop across the dynamic battery 300 such as may occur in a high power usage scenario. For instance, the dynamic anode material 316 may have a higher electrical potential than the primary anode material 314 such that during normal load scenarios, little or no ion flow and/or electrical conductivity occurs across the dynamic anode material 316. When power usage increases the power state event 508) such that voltage of the dynamic battery 300 decreases, activation of the dynamic anode material 316 occurs.

Similarly, the dynamic cathode material 322 may have a lower electrical potential than the primary cathode material 320 such that during normal load scenarios, little or no ion flow and/or electrical conductivity occurs across the dynamic cathode material 320. When power usage increases (e.g., the power state event 508) such that voltage of the dynamic battery 300 decreases, activation of the dynamic cathode material 322 occurs.

According to various implementations, activation of the dynamic anode material 316 and/or the dynamic cathode material 322 enables the dynamic battery 300 to utilize both the primary materials and the dynamic materials for the power flow 504 across the circuit 502.

Figure 6:
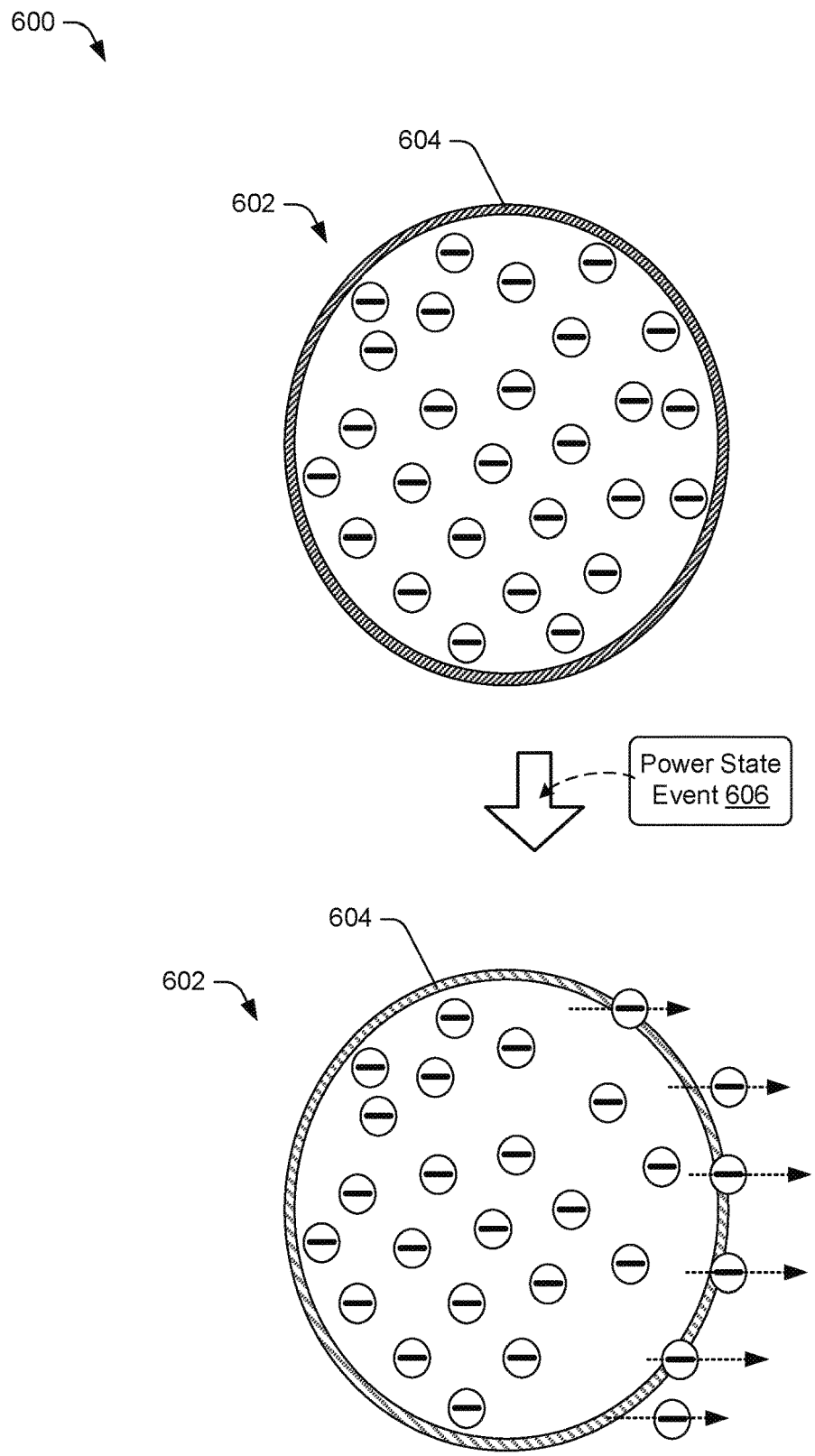
FIG. 6 depicts an example implementation scenario for activation of a dynamic battery material in accordance with one or more embodiments.

FIG. 6 depicts an example implementation scenario 600 for activation of a dynamic battery material in accordance with one or more implementations. The scenario 600, for instance, illustrates details of the scenario 500 discussed above.

The upper portion of the scenario 600 includes a dynamic anode material 602, which represents an instance of the dynamic anode material 316 introduced above. In the upper portion of the scenario 600, the dynamic anode material 602 is in an inactive state such that little or no flow of negative ions and/or electrons occurs across an external surface 604 of the dynamic anode material 600. For instance, the upper portion of the scenario 600 represents the dynamic anode material 602 in a standard operating state, aspects of which are detailed above.

Continuing to the lower portion of the scenario 600, a power state event 606 occurs that causes activation of the dynamic anode material 602. Examples of the power state event 606 and ways of activating the dynamic anode material 602 are discussed above. In response to activation, ion flow and/or electrical conductivity across the external surface 604 increases. As discussed above, this increase in ion flow and/or electrical conductivity enables the dynamic battery 300 to experience increased battery life in comparison with a scenario where the dynamic anode material 602 is inactive.

In at least some implementations, activation of the dynamic anode material 602 changes a crystalline structure of a crystalline surface of the anode material 602 (e.g., of the external surface 604) to alter its ion permeability and/or electrical conductivity. For instance, in an inactive state, the external surface 604 is ion impermeable and/or less ion permeable than in an active state, and may be electrically insulating. When the dynamic anode material 602 is activated, the ion permeability and/or electrical conductivity of the external surface 604 is increased such that ions and/or electrons flow across the dynamic anode material 602 for battery discharge and/or charging scenarios.

For example, consider a scenario where the dynamic anode material 602 is implemented as a nanoscale material, such as nanoparticles, nanotubes, and so forth. The nanoscale material may be doped with a magnetic material, such as magnetite. In such as a scenario, ion and/or electron conductivity of the dynamic anode material 602 is controllable by changing particle orientation. For instance, in an inactive state, the particles of the dynamic anode material 602 are arranged such that there is little or no ion and/or electron conductivity across the dynamic anode material 602. When activated, however, particles of the dynamic anode material 602 are reoriented such that ion and/or electron conductivity across the dynamic anode material is increased.

Although the scenario 600 is discussed with reference to a dynamic anode material, it is to be appreciated that in additional or alternative scenarios, a similar situation and attributes apply for a dynamic cathode material. For instance, permeability and/or conductivity of the dynamic cathode material 322 may be increased by activating the dynamic cathode material.

As an alternative or additional implementation, activation of the dynamic battery 300 may include electrolyte exchange. For instance, one or more of the battery controllers 326, 328 may withdraw some or all of the electrolytes 318, 324, and may inject a different electrolyte such that the dynamic battery 300 is activated according to techniques discussed herein.

Accordingly, the scenarios 400-600 illustrate that techniques discussed herein may leverage various battery configurations to accommodate changes in power requirements and different power scenarios.

Having discussed some example implementation scenarios for dynamically changing internal state of a battery, consider now some example procedures in accordance with one or more implementations.

Example Procedure

This section describes an example procedure for dynamically changing internal state of a battery in accordance with one or more implementations. The procedure is shown as a set of operations (or acts) performed, such as through one or more entities or modules, and is not necessarily limited to the order shown for performing the operation. The example procedure may be employed in the environment 100 of FIG. 1, the system 8 of FIG. 8, and/or any other suitable environment. According to one or more implementations, the procedure describes an example way for performing various aspects of the example implementation scenarios described above. In at least some implementations, steps described for the procedure are implemented automatically and independent of user interaction.

Figure 7:
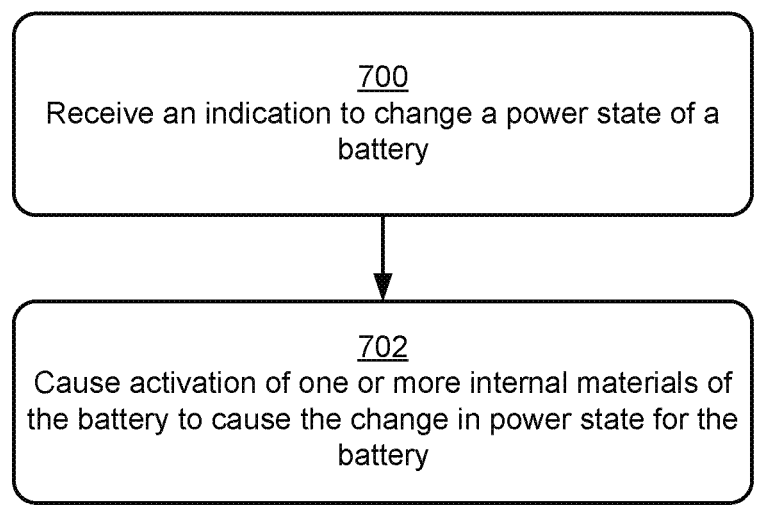
FIG. 7 is a flow diagram that describes steps in a method for changing internal state of a battery in accordance with one or more embodiments.

FIG. 7 is a flow diagram that describes steps in a method in accordance with one or more embodiments. The method, for instance, describes an example procedure for changing internal power state of a battery in accordance with one or more embodiments.

Step 700 receives an indication to change a power state of a battery. With regard to the environment 100, for instance, the indication indicates an increased power requirement for the computing device 102. The increased power requirement may result from various scenarios. Generally, the indication to change the power state corresponds to one or more of a battery discharge event for discharging power from the battery, and/or a battery charge event for charging the battery. For instance, an application 110 may require extra battery life to continue running. As another example, a hardware functionality may require extra battery life, such as a position detection device (e.g., for Global Positioning System (GPS) data), a wireless radio, the display 118, and so forth.

As another example, the change in power state may correspond to a battery charge event, such as for a quick charge scenario.

Step 702 causes activation of one or more internal materials of the battery to cause the change in power state for the battery. Example ways of changing power state of a battery are detailed above, and generally include heating an internal component of a battery (e.g., an electrolyte), releasing a catalyst to activate an internal component of a battery, providing external and/or internal stimulus to activate an internal component of a battery, and so forth.

In at least some implementations, the example procedure may be performed by the power manager 112, one or more of the battery controllers discussed above, and/or interaction between the power manager 112 and the battery controllers.

Having discussed an example procedure for dynamically changing internal state of a battery, consider now a discussion of an example system and device for performing various aspects of the procedure and implementation scenarios for dynamically changing internal state of a battery in accordance with one or more implementations.

Example System and Device

Figure 8:
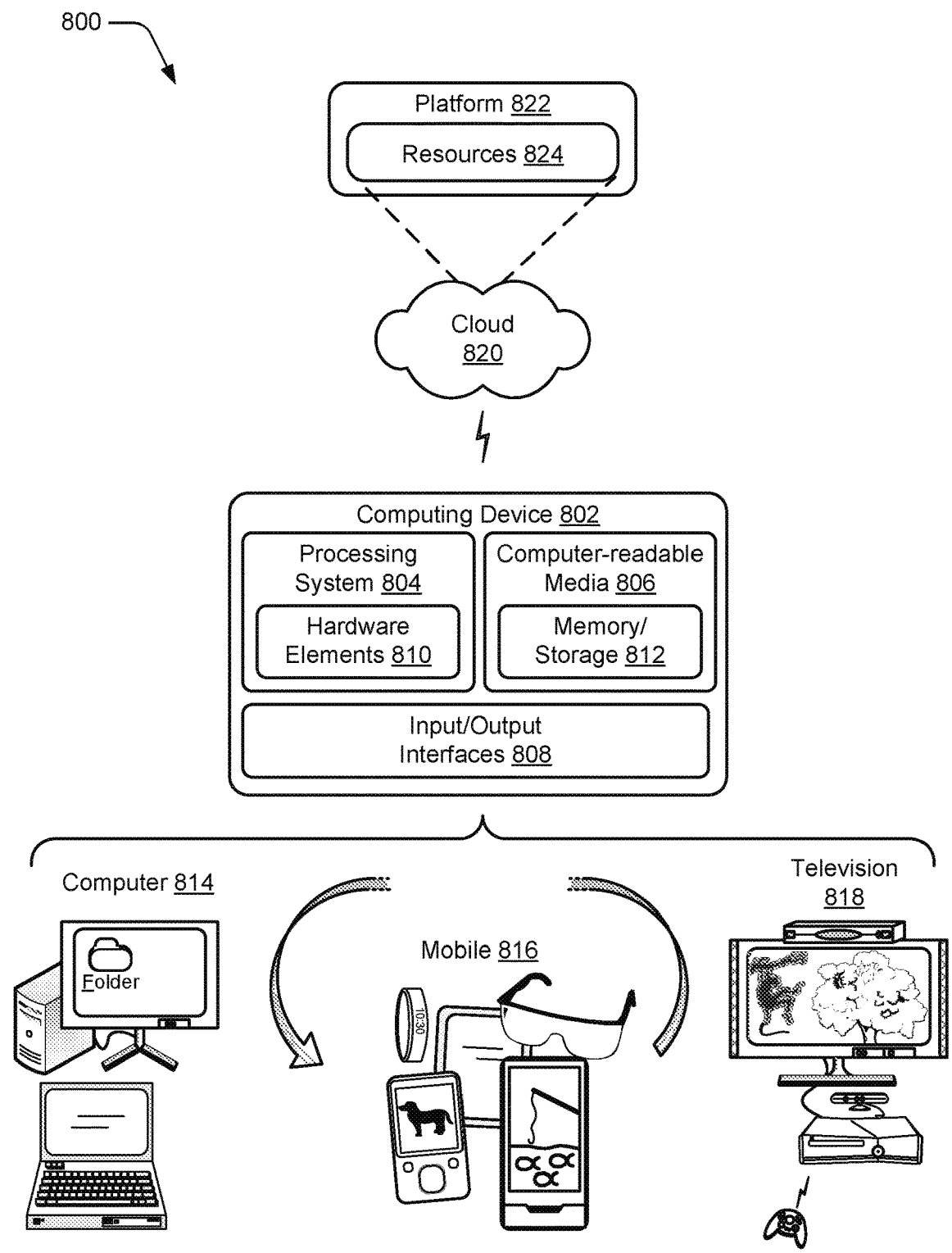
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the computing device 102 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 800.

Example implementations discussed herein include:

Example 1

A dynamic battery including: a positive electrode, a negative electrode, and a separator separating the positive electrode from the negative electrode, at least one of the positive electrode or the negative electrode including a primary electrode material and a dynamic electrode material different from the primary electrode material, the dynamic electrode material being activatable to change a power state of the dynamic battery.

Example 2

The dynamic battery of example 1, wherein the dynamic battery is associated with a standard operating mode and an activated operating mode, wherein in the standard operating mode the primary electrode material is active and the dynamic electrode material is inactive, and in the activated operating mode the dynamic electrode material is active.

Example 3

The dynamic battery of one or more of examples 1 or 2, wherein the dynamic battery is associated with a standard operating mode and an activated operating mode, wherein in the standard operating mode the dynamic electrode material is inactive such that one or more of ion flow or electrical conductivity across the dynamic electrode material is less than one or more of ion flow or electrical conductivity in the activated operating mode.

Example 4

The dynamic battery of one or more of examples 1-3, wherein the dynamic electrode material is activatable in response to an external stimulus applied to the dynamic battery.

Example 5

The dynamic battery of one or more of examples 1-4, wherein the dynamic electrode material is activatable in response to an external stimulus applied to the dynamic battery, the external stimulus including one or more of a catalyst applied to the dynamic electrode material, heating of the dynamic electrode material, mechanical activation, or radio wave activation.

Example 6

The dynamic battery of one or more of examples 1-5, wherein the dynamic electrode material is activatable in response to a voltage drop in the dynamic battery.

Example 7

The dynamic battery of one or more of examples 1-6, wherein activation of the dynamic electrode material causes the dynamic electrode material to transition from an inactive state to an active state, and wherein in the active state a discharge capacity of the dynamic battery is greater than in the inactive state.

Example 8

The dynamic battery of one or more of examples 1-7, wherein the dynamic battery powers one or more components of a computing device, and wherein the dynamic electrode material is activatable in response to a power state event generated by the computing device.

Example 9

The dynamic battery of one or more of examples 1-8, wherein the dynamic battery powers one or more components of a computing device, and wherein the dynamic electrode material is activatable in response to a power state event generated by the computing device, the power state event including one or more of a battery discharge-related event or a battery charge-related event.

Example 10

The dynamic battery of one or more of examples 1-9, wherein the dynamic battery powers one or more components of a computing device, and wherein the dynamic electrode material is activatable in response to an application-related event generated by the computing device.

Example 11

An apparatus including: a battery including an anode, a cathode, one or more electrolytes, and a separator separating the anode from the cathode; and a battery controller configured to cause heating of the one or more electrolytes to change a power state of the battery.

Example 12

The apparatus of example 11, wherein the battery provides power for one or more components of a computing device, and wherein the battery controller is configured to causing heating of the one or more electrolytes in response to a power event generated by the computing device.

Example 13

The apparatus of one or more of examples 11 or 12, wherein the battery provides power for one or more components of a computing device, and wherein the battery controller is configured to causing heating of the one or more electrolytes in response to an application-related event generated by the computing device.

Example 14

The apparatus of one or more of examples 11-13, wherein the battery provides power for one or more components of a computing device, and wherein the battery controller is configured to causing heating of the one or more electrolytes in response to a power event generated by the computing device, the power event including one or more of a battery discharge-related event or a battery charge-related event.

Example 15

The apparatus of one or more of examples 11-14, wherein heating of the one or more electrolytes causes the electrolyte to swell to increase a porosity of one or more of the anode or the cathode such that a discharge capacity of the battery is increased.

Example 16

The apparatus of one or more of examples 11-15, wherein heating of the one or more electrolytes causes the electrolyte to swell to increase a porosity of one or more of the anode or the cathode such that a charging rate of the battery is increased.

Example 17

A system including: one or more processors; and one or more computer-readable storage media storing instructions that are executable by the one or more processors to perform operations including: receiving an indication to change a power state of a battery; and causing activation of one or more internal materials of the battery to cause the change in power state for the battery.

Example 18

The system of example 17, wherein the battery powers one or more components of a computing device, and the indication to change the power state occurs in response to an increase in a power requirement of a computing device.

Example 19

The system of one or more of examples 17 or 18, wherein the one or more internal materials include an electrolyte, and wherein said causing activation includes causing the electrolyte to be heated to increase a discharge capacity of the battery.

Example 20

The system of one or more of examples 17-19, wherein the one or more internal materials include an electrode material, and wherein said causing activation includes causing a catalyst to be released within the battery to activate the electrode material and increase a discharge capacity of the battery.

CONCLUSION

Although embodiments of techniques and apparatuses dynamically changing internal state of a battery have been described in language specific to features and/or methods, it is to be understood that the subject of the appended claims is not necessarily limited to the specific features or methods described. Rather, the specific features and methods are disclosed as example implementations for dynamically changing internal state of a battery.

What is claimed is:

1. A device comprising:
a battery including a cathode including a first electrolyte and an anode including a second electrolyte;
a heating apparatus;
a battery controller to control operation of the battery based on a power discharge state of the battery, the operation including operation in (i) a standard operating state corresponding to a power discharge of the battery below a threshold and during which the battery supplies power to an external circuit and charges with the heating apparatus in an inactive state, and (ii) an activated operating state corresponding to a power discharge of the battery above the threshold that causes an increase in discharge capacity of the battery relative to the standard operating state, the operation in the activated operating state including the heating apparatus in an active state to apply heat to and swell at least one of the first electrolyte and the second electrolyte.

2. A device as recited in claim 1, wherein one of the first and second electrolytes include a liquid crystal solution.

3. A device as recited in claim 1, further comprising:
an electrode material in at least one of the first electrolyte and the second electrolyte; and
wherein in the standard operating state the ion flow or electrical conductivity across the electrode material is less than one or more of ion flow or electrical conductivity in the activated operating state.

4. A device as recited in claim 1, wherein the heating apparatus comprises a catalyst to be injected into the at least one of the first electrolyte and the second electrolyte to induce an exothermic reaction.

5. A device as recited in claim 4, wherein the catalyst includes at least one of platinum, silicon dioxide, titanium dioxide, and a zeolite.

6. A device as recited in claim 1, wherein the heating apparatus includes a radio frequency (RF) activation device to cause radio wave heating of the at least one of the first electrolyte and the second electrolyte.

7. A device as recited in claim 1, wherein the heating apparatus includes at least one magnet to cause magnetic heating of the at least one of the first electrolyte and the second electrolyte.

8. A device as recited in claim 1, wherein the heating apparatus is configured to vibrate the at least one of the first electrolyte or the second electrolyte.

9. A device as recited in claim 1, wherein the heating apparatus includes an optical device to cause optical heating of the at least one of the first electrolyte and the second electrolyte.

10. A device as recited in claim 1, wherein the heating apparatus is activatable in response to a voltage drop between the anode and the cathode.

11. A device as recited in claim 1, wherein the device powers one or more components of a computing device, and wherein the heating apparatus is activatable in response to an application-related event generated by the computing device.

12. A battery comprising:
a cathode including a first electrolyte;
an anode including a second electrolyte;
the first electrolyte or the second electrolyte including a material that swells in response to thermal stimulation and increases a discharge capacity of the battery relative to the battery without the thermal stimulation, the battery configured for operation in (i) a standard operating state corresponding to a power discharge of the battery below a threshold and during which the battery supplies power to an external circuit and charges with the heating apparatus in an inactive state, and (ii) an activated operating state corresponding to a power discharge of the battery above the threshold that causes an increase in discharge capacity of the battery relative to the standard operating state, the operation in the activated operating state including the heating apparatus in an active state to apply heat to and swell at least one of the first electrolyte and the second electrolyte.

13. A battery as recited in claim 12, wherein one of the first and second electrolytes include a liquid crystal solution.

14. A battery as recited in claim 12, further comprising:
an electrode material in at least one of the first electrolyte and the second electrolyte; and
wherein the ion flow or electrical conductivity across the electrode material without the thermal stimulation is less than one or more of ion flow or electrical conductivity with the thermal stimulation.

15. A battery as recited in claim 12, further comprising a catalyst in the at least one of the first electrolyte and the second electrolyte to provide the thermal stimulation.

16. A battery as recited in claim 15, wherein the catalyst includes at least one of platinum, silicon dioxide, titanium dioxide, and a zeolite.

17. A dynamic battery comprising:
   a first electrode;
   a second electrode;
   a first electrolyte electrically coupled with the first electrode; and
   a second electrolyte electrically coupled with the second electrode;
   the dynamic battery configured to operate in a standard operating state and an activated operating state based on a power discharge state of the dynamic battery, in the activated operating state, corresponding to a power discharge of the battery above a threshold, the dynamic battery heats at least one of the first electrolyte and the second electrolyte to swell at least one of the first electrolyte and the second electrolyte and increase a discharge capacity of the dynamic battery relative to the discharge capacity of the dynamic battery in the standard operating state.

18. A dynamic battery as recited in claim 17, wherein the dynamic battery is configured to heat the at least one of the first electrolyte or the second electrolyte through vibration.

19. A dynamic battery as recited in claim 17, wherein the dynamic battery is configured to heat the at least one of the first electrolyte and the second electrolyte through radio frequency (RF) stimulation.

* * * * *